Figure 1:
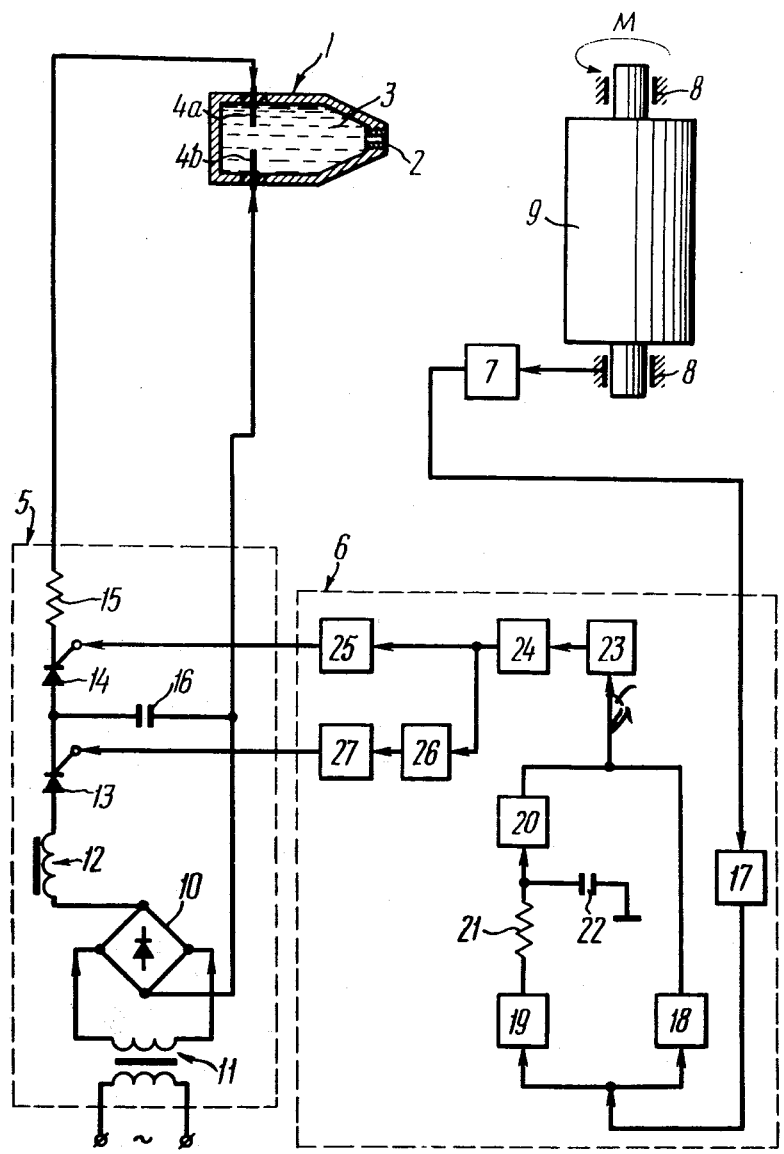

United States Patent [19]

Gusarov et al.

[11] 4,055,683
[45] Oct. 25, 1977

[54] METHOD OF BALANCING ROTORS

[76] Inventors: Anatoly Alexandrovich Gusarov, Universitetsky prospekt, 5, kv. 470; Lev Nixolaevich Shatalov, ulitsa Utrennyaya, 3, kv. 107, both of Moscow, U.S.S.R.

[21] Appl. No.: 725,992

[22] Filed: Sept. 23, 1976

Related U.S. Application Data

[62] Division of Ser. No. 474,106, May 28, 1974, Pat. No. 3,996,883.

[51] Int. Cl.$^2$ .............................................. B05B 12/04
[52] U.S. Cl. .......................................... 427/8; 73/462; 427/256; 427/425
[58] Field of Search ............................ 118/2.9, 8, 320; 346/75, 140; 101/1; 427/8, 9, 10, 256, 424, 425; 73/462–467

[56] References Cited

U.S. PATENT DOCUMENTS

| | | | |
|---|---|---|---|
| 1,306,985 | 6/1919 | Williams | 346/140 X |
| 2,731,887 | 1/1956 | Sjostrand | 118/9 X |
| 3,177,800 | 4/1965 | Welsh | 101/1 |
| 3,408,220 | 10/1968 | Bendix et al. | 118/8 X |

*Primary Examiner*—Morris Kaplan
*Attorney, Agent, or Firm*—Haseltine, Lake & Waters

[57] ABSTRACT

The present invention relates to balancing of rotors. The method of balancing rotors consists in successive application of portions of a liquid quickly solidifying compound to "light" points on the rotor surface, said portions being applied by the force of an electrohydraulic impact. A device for the realization of the method comprises a chamber for the balancing compound, said chamber containing electrodes connected to a pulse generator which is connected electrically with the output of a control unit whose input is connected to a transmitter which registers vibration parameters of the rotor while the latter rotates in supports in front of a nozzle in the chamber. At the moments when the "light" point on the surface of the a rotor passes in front of the nozzle, the transmitter sends signals to the control unit and, responding to these signals, the pulse generator sends corresponding electric pulses to the electrodes in the chamber; the resultant electrohydraulic impacts discharge portions of the balancing compound through the nozzle onto the "light" points of the rotor being balanced.

2 Claims, 3 Drawing Figures

METHOD OF BALANCING ROTORS

This is a division of application Ser. No. 474,106 filed May 28, 1974, now U.S. Pat. No. 3,996,883.

The present invention relates to a method of balancing rotors.

The invention can be used both for the static and the dynamic balancing of rotors, most successfully in systems for the automatic balancing of rotors in the course of their operation, i.e., for balancing grinding stones in the machine-building industry, turbogenerator rotors in the power engineering industry and gyroscope rotors in the instrument-building industry.

Known in the prior art is a method of balancing rotors wherein the rotor is rotated in supports, the vibration parameters of these supports are measured and these measurements are used to find the point on a rotor surface to which the balancing weight must be attached. This point will be referred to hereinafter as the "light" point.

Then the balancing weight is fastened to this point on the surface of the rotor by successive application to it of portions or amounts of a quickly solidifying liquid compound. This process is repeated until the unbalance of the rotor is brought down to the permissible limit.

In one of the known balancing methods the balancing compound consists of a molten metal which is applied to the surface of the rotor by exploding metal wire with the aid of an electric discharge.

The device for the realization of this method comprises an electromagnet with a fixed core having a gap with two pairs of guide rollers and a pair of high-voltage contacts connected to a capacitor battery installed on both sides of said gap.

A length of thin metal wire is pulled between these rollers by a guide; when this wire touches both high-voltage contacts, this produces a short circuit, the wire explodes, melts and the molten metal is applied to the "light" point on the surface of the rotor mounted in supports in front of the device. The "light" point is found by meansuring the vibration parameters of the rotor supports during the rotation of the rotor.

This known method of balancing rotors is adapted only for using a metallic balancing compound which restricts the field of application of the method.

It should also be taken into account that the explosion of the wire produces a metal cloud so that only a part of the total amount of molten metal is applied to the surface of the rotor being balanced; this also affects adversely the efficiency of the method.

A substantial disadvantage of the known balancing device lies in that, due to the necessity for pulling a thin metal wire between the guide rollers, the frequency of application of the portions or amounts of molten metal to the surface of the rotor is low, the portions themselves are small and cannot be controlled to suit the dimensions of the rotor and the degree of its unbalance; all this leads to a comparatively low efficiency of the device.

Besides, the conveyance of the thin wire from one set of contacts to the other and the possibility of the wire becoming welded to the contacts impair the reliability of the device.

Known from the prior art, covered by appropriate patents, is a device for balancing rotors wherein the portions of a liquid balancing compound are applied to rotors by a mechanical appliance (see, for example, U.S. Pat. No. 3,130,075).

This device comprises a chamber with a piston, the chamber being used as a reservoir for the liquid balancing compound, and a cylindrical bar with an axial bore, the inside of which communicates with the chamber and in which the rod of the piston moves. The piston is moved in the chamber by a mechanical appliance comprising a driving disc and cam discs, the last cam disc carrying a field coil and an impact mechanism.

The device also comprises a unit controlling the appliance and responding to the signals of the vibration transmitter which registers the vibrations of the supports on which the rotor is installed in the course of balancing.

As the rotor rotates in the supports, the signal of the support vibration transmitter (these vibrations being proportional to the unbalance of the rotor) enters the control unit and further the field coil on the cam disc. As a result the cam disc is attracted to the driving disc and strikes the head of the piston which pushes the rod in the bore of the bar, the latter being filled periodically with portions or amounts of the balancing compound from the chamber. The rod discharges each amount of the balancing compound onto the surface of the rotor exactly at the moment when the "light" point of its surface passes before the axis of the bore in the bar.

The disadvantages of this device, like those of the first-mentioned one, include infrequent discharges of the balancing compound because the appliance for discharging this compound comprises a number of mechanically linked parts, and the fact that the amounts of the discharged liquid balancing compound are constant and cannot be changed to suit the dimensions of the rotor and the degree of its unbalance.

A common disadvantage of the above-quoted devices for balancing rotors is also their comparatively complicated design incorporating a large number of movable parts and units which render these devices unreliable in service.

An object of the present invention resides in eliminating the aforesaid disadvantages.

The main object of the present invention is to provide a method of balancing rotors which makes it possible to change the mass of the amounts of a balancing compound to suit the weight of the rotor and the degree of its unbalance, to increase the frequency of the discharges, and which improves the efficiency and accuracy of the rotor balancing process as a whole.

This object is accomplished by providing a method of balancing rotors which consists in finding a "light" point on their surface and applying amounts of the balancing compound to this point, this process being repeated until the unbalance of the rotor is brought down to a permissible limit. It is important that each portion of the balancing compound is applied by the force of a controllable electrohydraulic impact.

The use of the energy of the controlled electrohydraulic impact according to the inventive method for the application of the balancing compound amounts to the surface of the rotor renders it possible to control the mass of the discharged amounts of this compound to suit the dimensions of the rotor, the degree of its unbalance, and to increase the frequency of application of the small amounts.

All these factors taken together provide for a highly efficient and accurate method of rotor balancing.

Another noteworthy advantage lies in that the balancing compound can be selected from a large number of materials whose only requirements are the possibility of keeping them in a liquid state, their capacity of adhering to the surface of the rotor, and the speed of their solidification on the rator surface. Such materials can be, for example, molten metals, plastics, resins and glues.

Figure 2:
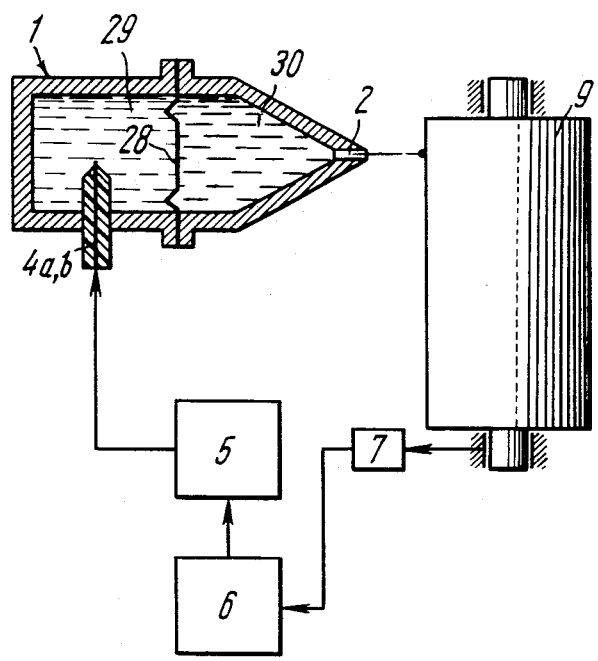
Figure 3:
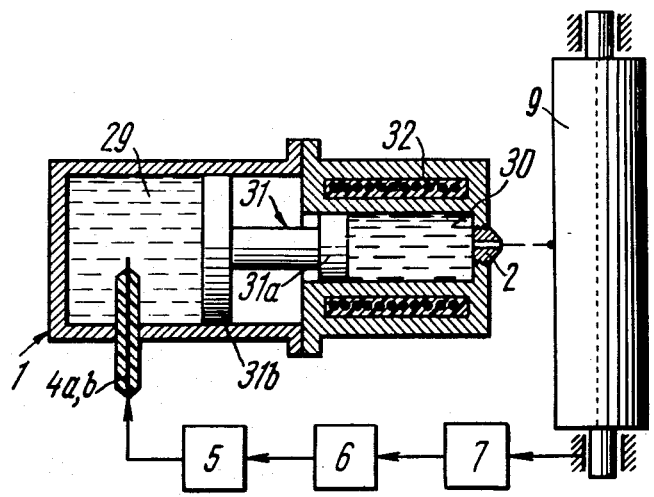

Now the invention will be described by way of example of the method of balancing rotors with reference to the accompanying drawings, in which:

FIG. 1 shows an electric block diagram of a rotor balancing device;

FIG. 2 — same, showing a longitudinal section of a second version of a chamber in the device; and;

FIG. 3 — same, showing a similar section of a third version of the chember.

The method of balancing rotors according to the invention consists in finding a "light" point on the surface of each rotor and successively applying to it portions or amounts of a liquid, quickly solidifying balancing compound. Such materials are, for example, molten metals, resins, glues, plastics, etc.

Each portion of the compound is applied under the effect of a controlled electrohydraulic impact. This process is repeated until the unbalance of the rotor is brought down to the permissible limit.

The position of the "light" point on the surface of the rotor is determined by the position of the "heavy" point, and the latter is found by measuring the vibration parameters of the rotor being balanced.

The exemplary device for balancing rotors, e.g., as shown at 9, comprises a closed cylindrical chamber 1 (FIG. 1) in a conventional housing, provided with a hole in one of its face surfaces, and a replaceable nozzle 2 screwed into the hole.

If the selected balancing compound can carry an electric discharge, the chamber 1 is filled with this compound 3 in a liquid state and an electric discharge produced in said compound, the discharge causes an electrohydraulic impact which discharges small amounts of the compound 3 through the nozzle 2.

For producing this impact, the chamber 1 contains two electrodes 4a and 4b connected to a discharge circuit of a pulse generator 5 which generates high-voltage electric pulses as a response to a signal of a control unit 6 whose output is connected to the generator.

The input of this generator control unit 6 is connected to a vibration transmitter 7 which registers vibration of supports 8 in which the rotor 9 being balanced is mounted in front of the nozzle 2 of the chamber 1.

The pulse generator 5 comprises a rectifier 10 whose input is connected parallel with a voltage-boost winding of a mains-powered transformer 11 while the output of the rectifier is connected to two parallel circuits. One of these comprises one of the electrodes 4a installed in the chamber 1 while the second one comprises a series-connected inductance 12, two switching devices in the form of thyristors 13 and 14, a shaping resistor 15 and the second electrode 4b. Connected in parallel with these circuits in a capacitance storing device 16.

The transformer 11, rectifier 10, inductance 12, thyristor 13 and capacitance storing device 16 form a charging circuit of the pulse generator 5 whereas the same storing device 16, thyristor 14, resistor 15 and both electrodes 4a and 4b form its discharge circuit.

The control unit 6 of the pulse generator 5 comprises an amplifier 17 whose input is connected to the transmitter 7 and the output is connected to two parallel circuits the first of which is a threshold device in the form of a Schmitt trigger 18 and the second one consists of two series-connected Schmitt triggers 19 and 20 with a resistor 21 between these triggers and provided with a parallel-connected capacitor 22, all these forming an integrating circuit.

The outputs of the triggers 18 and 20 are connected to the input of a signal-comparison circuit 23 also made in the form of a Schmitt trigger whose output is connected to the input of a pulse counter 24, the latter also comprising Schmitt triggers.

The outputs of the counter 24 are connected to the control electrodes of the thyristors 14 and 13 of the pulse generator 5 through two parallel circuits the first of which comprises an amplifier 25 while the second one has a series-connected signal-delay circuit 26 made in the form of a single flip-flop oscillator and an amplifier 27.

In another version of the device for balancing the rotors 9 the chamber 1 accommodates a movable partition in the form of a membrane 28 (FIG. 2) which divides the chamber into two isolated spaces 29 and 30 so that the electrodes 4a and 4b are installed in the space 29 which is filled with a neutral liquid, e.g., water, producing electrohydraulic impact whereas the nozzle 2 is located in the space 30 filled with the balancing compound 3 in a liquid state.

During the electric discharge between the electrodes 4a and 4b in the space 29, the movable partition 28 takes up the pressure produced by the electrohydraulic impact and transmits it to the balancing compound contained in the adjacent space 30.

Such a division of the chamber 1 into two isolated spaces 29 and 30 makes it possible to use balancing compounds, e.g., metals, in which it is difficult to produce an electrohydraulic impact to their electric conductivity.

The movable partition in the form of a flexible membrane 28 is simplest and most reliable in operation since its movement involves no danger of warping or jamming. However, such a membrane 28 precludes the possibility of using up the entire mass of the liquid balancing compound contained in the space 30 of the chamber 1 because of the limited movement of the membrane 28.

Besides, when the rotors are balanced with the aid of liquid substances at elevated temperatures, the membrane 28 fails to ensure sufficient heat insulation between the spaces 29 and 30.

In such cases the movable partition can be made in the form of a piston 31 (FIG. 3) capable of moving axially in the chamber 1, this movement being sufficient for utilizing the entire mass of the balancing compound contained in the space 30 of the chamber 1.

Such a piston 31 can be made from a material with a low coefficient of heat transfer or it can have heat-insulating inserts to ensure heat insulation between the spaces 29 and 30 of the chamber 1 if the liquids in these spaces must have different temperatures.

To attain a higher accuracy of rotor balancing by reducing the mass of each small portion or amount of the balancing compound and to increase the initial velocity of the discharged portions, one of the versions of the chamber 1 is provided with a two-step piston 31 (as shown in FIG. 3) installed so that a smaller step 31a therein enters the space 30 of the chamber 1 filled with the balancing compound. The larger step 31b is in space 30, connected with step 31a by an intermediate member.

Such a piston 31 functions as a hydraulic booster, raising the pressure in the corresponding space 30 above the pressure arising during the electrohydraulic impact in the adjacent space 29 and increasing the initial velocity of the discharged portion of the balancing compound with a simultaneous reduction of the mass of each portion. In this case the coefficient of pressure rise will be equal to the ratio of the areas of the larger 31b and the smaller 31a steps of the piston 31 with a corresponding reduction of the mass of the discharged portion of the balancing compound which eventually improves the accuracy of rotor balancing.

In order to control the efficiency and accuracy of balancing by changing the mass and initial velocity of the discharged portions of on amounts the balancing compound at a constant energy of the electrohydraulic impacts, the nozzle 2 of the chamber 1 is installed with a provision for its replacement. This renders it also possible to change the shape and size of the channel in the nozzle 2 to suit the properties of the balancing compound, e.g., forces of surface tension.

When the balancing compound is in a liquid state and at a high temperature, the chamber 1 may be enclosed in a housing accommodating an appliance in the form of an electric heater 32 for heating the chamber.

The exemplary device for balancing rotors functions as follows. When the pulse generator 5 is fed by A.C. mains, with the thyristor 13 open, the capacitor 16 becomes charged through the transformer 11, rectifier 10, inductance 12 and thyristor 13.

When the charging current passes the zero point, the thyristor 13 closes and the capacitor 16, owing to the presence of the inductance 12 in the circuit, is charged to almost twice the previous voltage of the rectifier 10. Thus the generator 5 is readied for operation.

Then the rotor 9 is set in rotation in the supports 8. The transmitter 7 produces a sinusoidal signal whose amplitude depends on the vibration parameters of the supports 8 of the rotor 9, these parameters being proportional to its unbalance. The maximum and minimum levels of the signal from the transmitter 7 correspond to the positions of the "heavy" and "light" points on the surface of the rotor 9.

The signal of the transmitter 7 is delivered through the amplifier 17 to the trigger 18 which acts as a threshold device wherein the signal of the transmitter 7 is compared against a certain voltage which corresponds to the permissible unbalance of the rotor.

If the unbalance of the rotor 9 exceeds the permissible level, the trigger 18 receives a signal which is stronger than the operational threshold; the trigger opens and produces a rectangular signal.

At a voltage which is equal to the opening voltage, the trigger 18 will close. However, at various amplitudes of the signal produced by the transmitter 7, the operating time of the trigger 18 will differ somewhat which may affect the accuracy of balancing.

This disadvantage is countered by providing a second electric circuit which is parallel to the first one and contains the trigger 19, also receiving the signal from the transmitter 7. That trigger 19 in this case operates at a very low voltage so that the width of its output pulse coincides almost exactly with the wdith of the positive half-wave of the sine curve coming from the transmitter 7 through the amplifier 17.

The rectangular signal is delivered from the trigger 19 into the integrating circuit formed by the resistor 21 and the capacitor 22; the output voltage of this circuit opens the trigger 20 whose operating threshold is selected so that it opens when the signal of the transmitter 7 reaches its maximum value regardless of its absolute value.

From the triggers 18 and 20 the signals reach the signal-comparison circuit 23 which opens only when signals are present at the outputs of both triggers 18 and 20, thus giving a command at the same position of the vibration phase of the rotor 9 corresponding to the moment when the "light" point on the surface of the rotor 9 passes in front of the nozzle 2 of the chamber 1.

To eliminate the influence on the balancing accuracy of the forced rotor vibrations caused by the impacts of the amounts of the balancing compound applied to the rotor, the balancing compound is discharged from the nozzle 2 of the chamber 1 on the surface of the rotor 9 once in a certain number of its revolutions. Therefore the pulse signals are sent from the comparison unit 23 to the counter 24 whose output produces one pulse after receiving a preset number of pulses at the counter input.

The pulse passes from the counter 24 through the amplifier 25 to the thyristor 14 which opens and passes the charge from the capacitor 16 through the shaping resistor 15 to the electrodes 4a and 4b; the discharge occurring in the gap between the electrodes produces an electrohydraulic impact in the balancing compound. Under the effect of this impact a small amount of the balancing compound is discharged through the nozzle 2 from the chamber 1 onto the surface of the revolving rotor 9 exactly at the moment when its "light" point passes before the axis of the nozzle 2. Each discharged portion or amount of the liquid balancing compound becomes quickly solidified, thus reducing the unbalance of the rotor 9.

At the end of the discharge of the capacitor 16 the thyrystor 14 closes. The pulse opening the thyristor 14 is sent concurrently with the pulse directed through the amplifier 25 and the delay circuit 26 to the control electrode of the thyristor 13. The delay unit 26 opens the thyristor 13 and starts charging the capacitor 16 only on completion of the processes in the discharge circuit of the pulse generator 5.

The process of discharging the portions of liquid balancing compound on the rotor 9 is repeated in cycles until the unbalance of the rotor is reduced below the permissible level. In this case the signal delivered from the transmitter 7 through the amplifier 17 to the trigger 18 will become lower than the operating voltage of the latter so that the trigger 18 will stay closed, the opening signal to the thyristor 14 will be discontinued and the process of balancing the rotor 9 is completed.

The inventive balancing method, based on the utilization of the energy of the electrohydraulic impact for the discharge of portions or amounts of the liquid balancing compound render it possible to control the mass of the discharged liquid and to raise considerably the frequency of the discharges. Besides, the mass of these portions can be controlled to suit the unbalance of the rotor, which ensures a high efficiency and accuracy of the balancing.

This also widens the range of the materials used as balancing compounds since the governing factor in each particular case is the possibility of keeping this material in a liquid state, the adhesion of this material to the surface of the rotor and the speed of its solidification. The device according to the invention can be used with such balancing materials as, for example, molten metals, resins, glues, plastics, etc.

What is claimed is:

1. A method of balancing rotors, comprising a procedure including the steps of: finding a "light" point on the surface of the rotor being balanced while being rotatably supported in front of a nozzle measuring the parameters of vibration of the rotor while rotating; transmitting a signal to nozzle energizing means in response to said vibration parameter measurement during rotor vibration; discharging predefined successive amounts of a quickly solidifying balancing compound in the liquid state from the nozzle to said "light" point; employing a force of a controllable electro-hydraulic impact for governing the mass of the compound applied to said rotor; and repeating the procedure until balance of the rotor is attained.

2. A method as claimed in claim 1, including the steps of: reducing the compound discharge mass normally attainable through said electro-hydraulic impact by employing a pressure differential acting thereon to increase the initial velocity of compound discharge from said nozzle.

* * * * *